(12) United States Patent
Sachdev et al.

(10) Patent No.: US 10,430,488 B2
(45) Date of Patent: Oct. 1, 2019

(54) MANAGING SYSTEMS HOSTED AT DATA CENTERS

(71) Applicant: Microsoft Technology Licensing, LLC, Redmond, WA (US)

(72) Inventors: Sanjay Sachdev, San Jose, CA (US); Hao Liu, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 583 days.

(21) Appl. No.: 15/224,242

(22) Filed: Jul. 29, 2016

(65) Prior Publication Data

US 2018/0032566 A1 Feb. 1, 2018

(51) Int. Cl.

| | |
|---|---|
| *G06F 17/30* | (2006.01) |
| *G06F 16/958* | (2019.01) |
| *G06F 16/9535* | (2019.01) |
| *G06F 16/28* | (2019.01) |
| *G06F 16/25* | (2019.01) |
| *G06F 16/29* | (2019.01) |
| *G06Q 30/02* | (2012.01) |

(52) U.S. Cl.
CPC ........ *G06F 16/958* (2019.01); *G06F 16/9535* (2019.01); *G06F 16/254* (2019.01); *G06F 16/285* (2019.01); *G06F 16/29* (2019.01); *G06Q 30/0242* (2013.01); *G06Q 30/0277* (2013.01)

(58) Field of Classification Search
CPC ............... G06Q 30/0277; G06Q 30/02; G06Q 30/0242; G06F 16/9535; G06F 16/29; G06F 16/254; G06F 16/285; G06F 16/9537

USPC ............... 707/737, 741, 602, 709, 752, 756; 705/14.41, 14.71
See application file for complete search history.

(56) References Cited

U.S. PATENT DOCUMENTS

| | | | |
|---|---|---|---|
| 2010/0241498 A1* | 9/2010 | Chung | G06Q 30/02 705/14.5 |
| 2014/0279876 A1* | 9/2014 | Prasanna | G06F 16/211 707/610 |
| 2016/0085810 A1* | 3/2016 | de Castro Alves | G06F 16/24568 707/752 |
| 2016/0155141 A1* | 6/2016 | Song | G06Q 30/0242 705/14.41 |
| 2016/0171113 A1* | 6/2016 | Fanous | G06F 16/9535 705/14.66 |
| 2017/0004527 A1* | 1/2017 | Wu | G06Q 30/0255 |
| 2017/0091808 A1* | 3/2017 | Yu | G06Q 30/0246 |

(Continued)

*Primary Examiner* — Dangelino N Gortayo
(74) *Attorney, Agent, or Firm* — Hickman Palermo Becker Bingham LLP

(57) ABSTRACT

A data center management system is described herein which implements techniques for receiving an event at a first data system and updating data objects stored at another data system. The first data system may receive multiple events within a given a time frame and perform the proper updates to the other data system when certain criteria are met. The data center management system may be responsible for at least two different types of data systems. For example, the first data system may be of the first type of data system and the second data system may be of the second type of data system. The first type of data system may have different technical requirements (e.g., latency, responsiveness, or other requirements), different than the second type of data system.

20 Claims, 5 Drawing Sheets

(56) References Cited

U.S. PATENT DOCUMENTS

2017/0140422 A1* 5/2017 Kolay ............... G06Q 30/0247
2017/0330239 A1* 11/2017 Luo .................. G06Q 30/0269

* cited by examiner

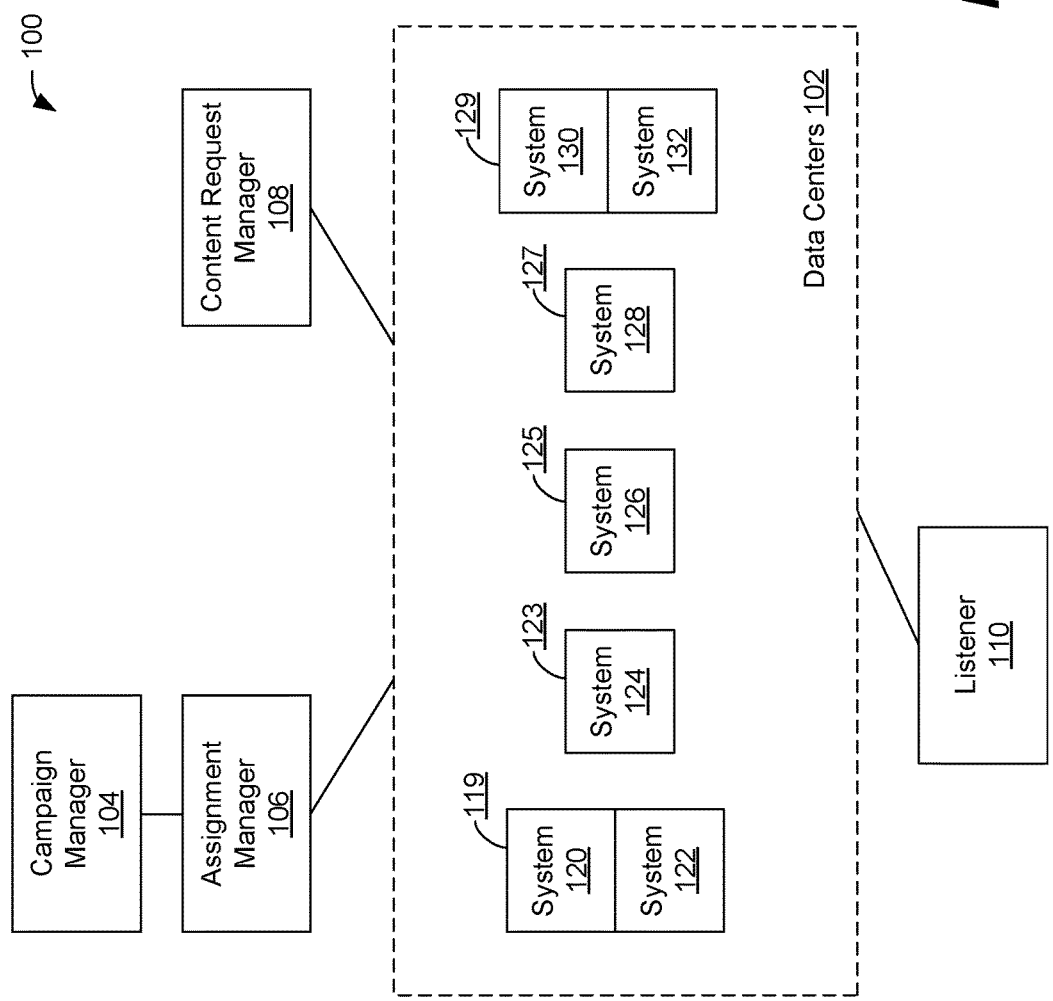

MANAGING SYSTEMS HOSTED AT DATA CENTERS

TECHNICAL FIELD

The present disclosure relates to data processing in one or more data centers and, more specifically, to data centers where systems are arranged in a primary system configuration and a secondary system configuration. SUGGESTED GROUP ART UNIT: 2126; SUGGESTED CLASSIFICATION: 700.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data centers may host one or more data systems that work in tandem by sharing and distributing different tasks among different types of systems. For example, while one data system may be used to track allocation of an item's resource, another data system may be used to track when the item's resource is exhausted. These data systems may need to work together, such as notifications from data systems of the first type to data systems of the second type when the allocation is exhausted.

Further, not all data systems are built similarly. Data systems have different purposes and these purposes dictate different requirements that may be needed for each data system. For example, a data system for tracking resource allocation may require lower latency and higher responsiveness than the data system for tracking whether the allocation is exhausted. This is because while the data system for tracking allocation may receive many data events in a given moment, the data system for tracking when allocation is exhausted may not have such high volume of data events.

Additionally, data systems may be assigned different items and assignments may change at any given moment. For example, there may be legal requirements that dictate a geographic location that a resource-exhausted item needs to be registered before being updated in other geographic locations. As another example, items may be assigned to a data system, but because of load-balancing and other work distribution issues, another data system may be assigned to take over some of the responsibilities of the previous data system.

Therefore, there is a need to optimize how different systems interact and improve overall system robustness, while achieving each respective data system's purpose.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1A illustrates a data center management system in which the techniques described may be practiced according to certain embodiments.

DETAILED DESCRIPTION

Figure 1C:
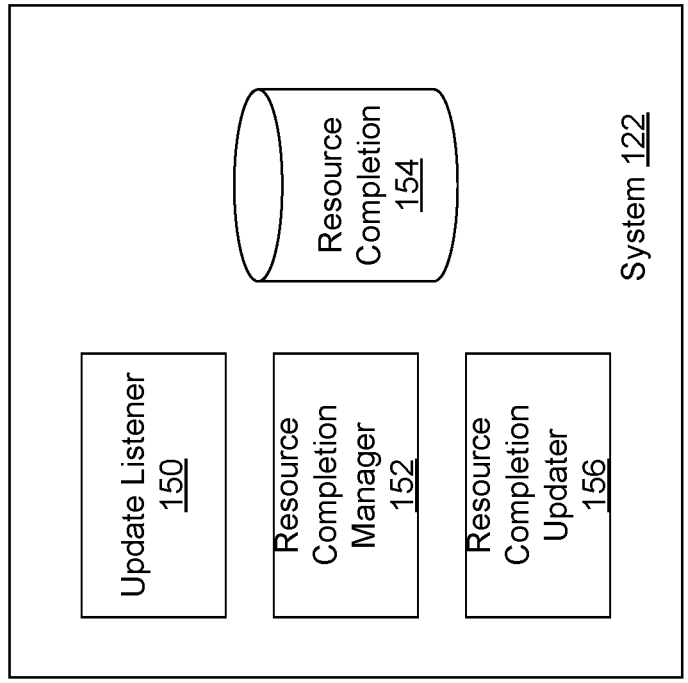
FIG. 1C shows an example embodiment of a second type of data system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Certain embodiments are described in the context of working with a data center management system, used together with a content item exchange. However, it is understood that a content item exchange is only a specific type of system, of which there are others, which may support the data center management system.

Embodiments are described in sections below according to the following outline:

1.0 GENERAL OVERVIEW
 1.1 SAMPLE USE CASE: CAMPAIGN MANAGEMENT
2.0 STRUCTURAL OVERVIEW
 2.1 TYPES OF DATA SYSTEMS
 2.2 ASSIGNED DATA SYSTEMS
 2.3 INFORMATION STORED AT THE DATA SYSTEMS
 2.4 GEOGRAPHIC LOCATIONS OF DATA CENTERS
3.0 EXAMPLE METHOD FOR A DATA CENTER MANAGEMENT SYSTEM
 3.1 DETERMINE EVENT HAS OCCURRED
 3.2 UPDATE RESOURCE ALLOCATION LEVEL
 3.3 DETERMINE CAMPAIGN ASSIGNMENT
 3.4 DETERMINE EVENT ASSIGNMENT
 3.5 UPDATE DATA OBJECT AT A SYSTEM
 3.6 UPDATE DATA OBJECTS AT ADDITIONAL SYSTEMS
 3.7 DISALLOW ACCESS TO CAMPAIGN
4.0 IMPLEMENTATION EXAMPLE—HARDWARE OVERVIEW 1.0 General Overview A data center management system is described herein which implements techniques for receiving an event at a first data system and, in response, updating data objects stored at another data system. The first data system may receive multiple events within a given a time frame and perform the proper updates to the other data system when certain criteria are met. In an embodiment, some criteria may include whether the first data system is the data system responsible for an item associated with the event, whether a resource allocation for the item has been exhausted, whether the other data system is responsible for the item, or any combination of these.

The data center management system may be responsible for at least two different types of data systems. For example, the first data system may be of a first type and the second data system may be of a second type. The first type of data system may have different technical requirements (e.g., latency, responsiveness, or other requirements) than the second type of data system. The data center management system may include multiple instances of these data systems located in two or more data centers that are communicatively coupled through one or more network data connections.

The following presents a sample use case of the data center management system with a campaign management system. Although the specification refers to this embodiment, the principles as described herein are generally applicable to other types of systems where there is a need for management of data systems across data centers.

1.1 Sample Use Case: Campaign Management

In an embodiment, a data center management system is used with a campaign management system. In a campaign management system that manages content delivery campaigns, a campaign (which is a type of item) is associated with one or more content items and a resource allocation. Examples of content items may include advertisements, user-provided content, movies, pictures, and many other types of content items. Examples of a resource allocation is a monetary budget, a memory usage budget, or a CPU budget. Once a budget has been reached for a campaign or a campaign's content item, additional requests will not be responded to with the content item (or content items associated with the campaign). Different types of activities may cause a resource allocation for a campaign to change. In the advertisement embodiment of the data center management system, there may be different content item models. In a selected content item model, when a content item associated with a campaign is selected, a resource allocation for the campaign is modified. For example, whenever a content item included in a campaign is selected to be displayed to a user, a portion of a budget for the campaign is used. In other words, there may be a fee charged to show the content item, such as a flat fee, a fee determined by an auction, or other fee. Once this budget is met, the content item will be unavailable for future requests. In a per-click model, selecting a content item does not cause a budget of a campaign to be used. Instead, after the content item is selected and presented to a user, the user clicking on or otherwise selecting the content item causes a resource allocation for the campaign to change. Embodiments of the data center management system may operate using the selected content item model, the per-click model, or both of these models.

As an example, a first type of system in the data center management system may be used for tracking the current resource allocation for a campaign. The first type of system may be responsible for updating the resource allocation of one or more campaigns with one or more content items. Many events may occur during a given time. Sometimes, the first type of system may be required to track and update information down to the millisecond level. On the other hand, the second type of system may be dedicated to tracking whether the resource allocation has been exhausted. The second type of system may be responsible for less demanding responsiveness, when compared to the first type of system. For example, updates to these systems may occur within minutes.

2.0 Structural Overview

FIG. 1A illustrates a data center management system 100 in which the techniques described may be practiced according to certain embodiments. The data center management system 100 is a computer-based system. The various components of the data center management system 100 are implemented at least partially by hardware at one or more computing devices, such as one or more hardware processors executing instructions stored in one or more memories for performing various functions described herein. For example, descriptions of various components (or modules) as described in this application may be interpreted as providing pseudocode, an informal high-level description of one or more computer structures. The descriptions of the components may be converted into software code, including code executable by an electronic processor. The data center management system 100 illustrates only one of many possible arrangements of components configured to perform the functionality described herein. Other arrangements may include fewer or different components, and the division of work between the components may vary depending on the arrangement.

The data center management system 100 may include a group of data centers 102 with data centers 119, 123, 125, 127, and 129 and hosting data systems 120, 122, 124, 126, 128, 130, and 132. A data center may include one or more data systems. For example, FIG. 1A shows the data center 119 including data systems 120 and 122, while another data system 123 includes a data system 124. Each data system may be assigned to one or more tasks, and a result of the tasks performed by a data system may be used by other data systems to complete its respective task. Although seven data systems are shown in FIG. 1A, there may be any number of data systems that may be supported by the data center management system 100. For example, there may be more or fewer data systems than the seven shown in FIG. 1A. Generally, having more data systems may result in more data redundancy (e.g., protection against failure in one of the data systems), while fewer data systems may reduce overall cost (e.g., fewer data centers to maintain).

There are many different types of data centers upon which the data center management system 100 may be implemented. In an embodiment, data centers included within the data center management system 100 are embodied at least in part on colocation centers. A colocation center (or colo) is a type of data center that may include one, two, or more data systems. The colo may include a variety of support services to run the data systems. For example, a colo may include space, power, cooling, and physical security for the server, storage, and networking equipment, as well as a network connection, with a minimum of cost and complexity. Use of colos may assist an entity in establishing a large web presence, without unnecessary overhead of creating a dedicated data center for a single system.

A campaign manager component 104 is responsible for receiving campaigns and associated campaign information. Some examples of information that may be received or provided by the campaign manager component 104 include identification information on a campaign, one or more content items associated with the campaign, information on when the campaign should be selected, a campaign identifier, a resource allocation for the campaign, other related campaign information, or any combination of this information.

A content request manager component 108 is responsible for receiving and transmitting events to the group of data centers 102. For example, in the campaign management embodiment of the data center management system 100, this includes incoming ad events (e.g., indicating clicks and/or impressions).

A listener component 110 is responsible for updating information between different data systems. For example, the listener component 110 facilitates updates between different data systems. For example, if one type of data system is required to update data systems of the same type, the listener component 110 may receive information from a data system and transmit a message to update other data systems as necessary.

2.1 Types of Data Systems

Figure 1B:
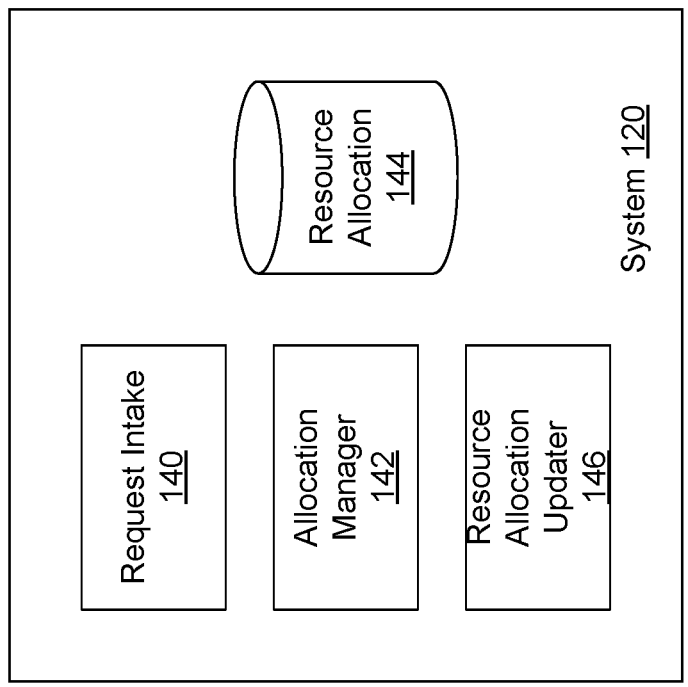
FIG. 1B shows an example embodiment of a first type of data system.

In an embodiment, the data center management system 100 includes at least two types of data systems, such as any of the data systems 120, 122, 124, 126, 128, 130, or 132. For example, FIG. 1B shows an example embodiment of a first type of data system. FIG. 1C shows an example embodiment of a second type of data system. However, each of the data system types as described here may be applied to any of the other data systems, such as data systems 124, 126, 128, 130, or 132.

Referring to FIG. 1B, a request intake component 140 receives events from the content request manager component 108. The request intake component 140 may also determine whether it is the data system assigned to a particular campaign associated with an event. Even if the data system 120 is not assigned to the particular campaign, it may update information stored at the data system 120 based on the particular request.

An allocation manager component 142 is responsible for updating a campaign budget in a resource allocation data source 144. Each campaign stored in the resource allocation data source 144 may include information on all, a subset, or just one campaign managed by the data center management system 100. To update the resource allocation data source 144, the allocation manager component 142 identifies, from the resource allocation data source 144, data corresponding to a campaign. The data includes a current resource level of the campaign. The allocation manager component 142 determines, based on the particular event, an amount to subtract from the current resource level and updates the data in the resource allocation data source 144 accordingly. A resource allocation updater component 146 is responsible for determining whether a resource level has been exhausted. If the resource level has been exhausted, then the data center management system 100 may cause a data system of the second type to update.

Referring to FIG. 1C, an update listener 150 is responsible for checking whether, based on results from the first type of data system, information needs to be updated. A resource completion manager component 152 is responsible for updating whether a campaign has been exhausted, and update the information in a resource completion data source 154. Each campaign stored in the resource completion data source 154 may include information on all, a subset, or just one campaign managed by the data center management system 100. To update the resource completion data source 154, the resource completion manager component 152 identifies, from the resource completion data source 154, a data object corresponding to a campaign. The data object includes a status of a particular campaign and is modified to indicate that a resource associated with particular campaign has been exhausted.

In an embodiment, the status of a particular campaign may be represented at least in part on a Boolean value. For example, if the Boolean value a Boolean TRUE value may indicate that the particular campaign has been exhausted while a Boolean FALSE value may indicate that the particular campaign has not been exhausted. Related information may also be stored with the data object, such as when the particular campaign was exhausted, whether the resource allocation level has reached zero or other value, where an event that caused the exhaustion occurred, or any other related information. In alternate embodiments, the status of a particular campaign may represent additional campaign status. For example, in addition to whether a campaign is exhausted or has not been exhausted, the status of a particular campaign may include additional status such as whether the campaign is nearing exhaustion, whether the campaign has been momentarily placed on hold (e.g., disallow selection of the campaign until an instruction to resume the campaign has been received), or other status values.

A resource completion updater 156 is responsible for updating other, if any, data systems of the second type that a particular campaign has been exhausted. For example, the resource completion updater 156 may notify the listener component 110 to update other data systems of the second type.

2.2 Assigned Data Systems

An assignment manager component 106 is responsible for assigning a campaign to one or more of the data centers 102. For example, a campaign may be assigned to one data system of the first type and one data system of the second type. This does not necessarily mean that, if a data system is not the assigned data system for a particular campaign, the data system will not include information on the particular campaign. Instead, as described in greater detail elsewhere, an assigned data system is responsible in the data center management system 100 for instructing how information in the data center management system 100 is to be updated and/or when an update is needed. This may include providing the information to be updated to a listener or placing the update on a queue.

In an embodiment, the assignment manager component 106 receives information from an administrator or other user regarding to which data center or data system a campaign is to be assigned. The administrator may also, subsequent to assigning a campaign to a data center or data system, change where the campaign is assigned. In other embodiments, the assignment manager component 106 receives a list of factors to consider before assigning a campaign. For example, when a campaign is received to assign to a data system, the assignment manager component 106 receives information identifying the geographic region in which the campaign should be located, performance demands for the assignment, or other factors. Alternatively, at least some campaigns may be automatically assigned based on a (e.g., unique) identifier associated with each campaign. For example, if a campaign identifier falls within a certain range of values or the result of an operation (e.g., modulo) involving a campaign identifier is a certain value, then the campaign is assigned to the data center or data system associated with that value or range of values.

2.3 Information Stored at the Data Systems

In an embodiment, information stored by each data system of the first type will be the same and data stored by each data system of the second type will be the same. This provides redundancy for information, in case of system failure at any particular point in time.

In a specific embodiment, having the same data does not mean that, at all points in time, the data systems will have the exact same information. For example, there may be circumstances where one data system of the first type is slower than other data systems of the first type. There may be a backlog of event information at the one data system or general network congestion causing the one data system to receive event information at a delayed rate. In this case, other data systems of the first type may include more event information than the one data system at a given time. As another example, there may be circumstances where one data system of the second type contains more information than other data systems of the second type. There may be a delay between an owner data system of the second type updating information with other data systems of the second type.

2.4 Geographic Locations of Data Centers

Figure 2:
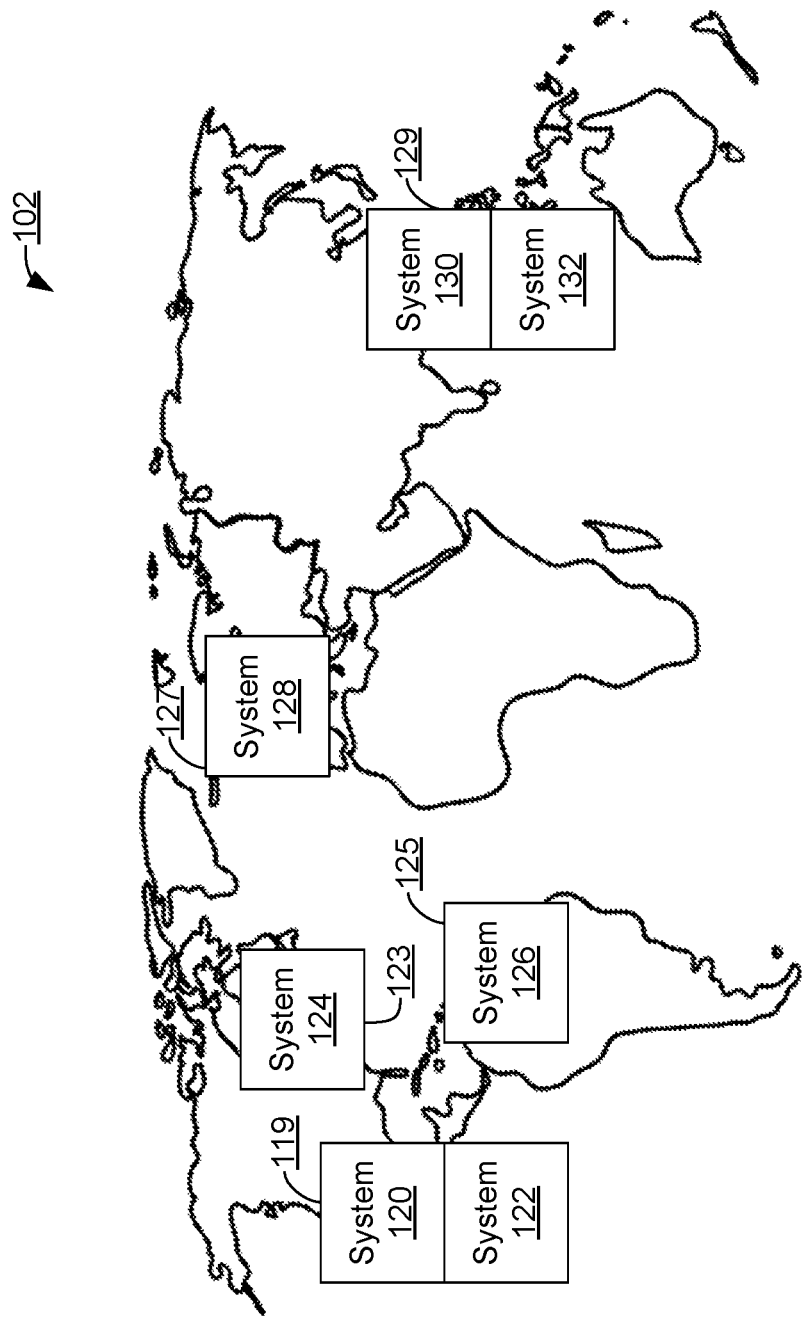
FIG. 2 shows an embodiment of the data center management system including data centers located in different countries.

In an embodiment, the data center management system 100 may include data centers that are located in different geographic locations. A geographic location may be of different granularity, such as data centers located in a different country, state, region, area, or other. FIG. 2 shows an embodiment of the data center management system 100 including data centers located in different countries. For example, data systems 120 and 122 are hosted at a data center in North America, while data systems 130 and 132 are hosted at a data center in South East Asia.

Locating data systems across different geographic locations may provide different advantages for the data center management system 100. As one advantage, this provides robustness to the data center management system 100. For example, if there is an unplanned emergency where one data system is located, other data systems that are not affected by the emergency may continue to operate as normal. As another advantage, some countries may include various legal and tax compliance regulations. For example, if a campaign's owner is located in a specific country, they may be required to locate their information (e.g., resource completion information) in a specific geographic location.

3.0 Example Method for a Data Center Management System

Figure 3:
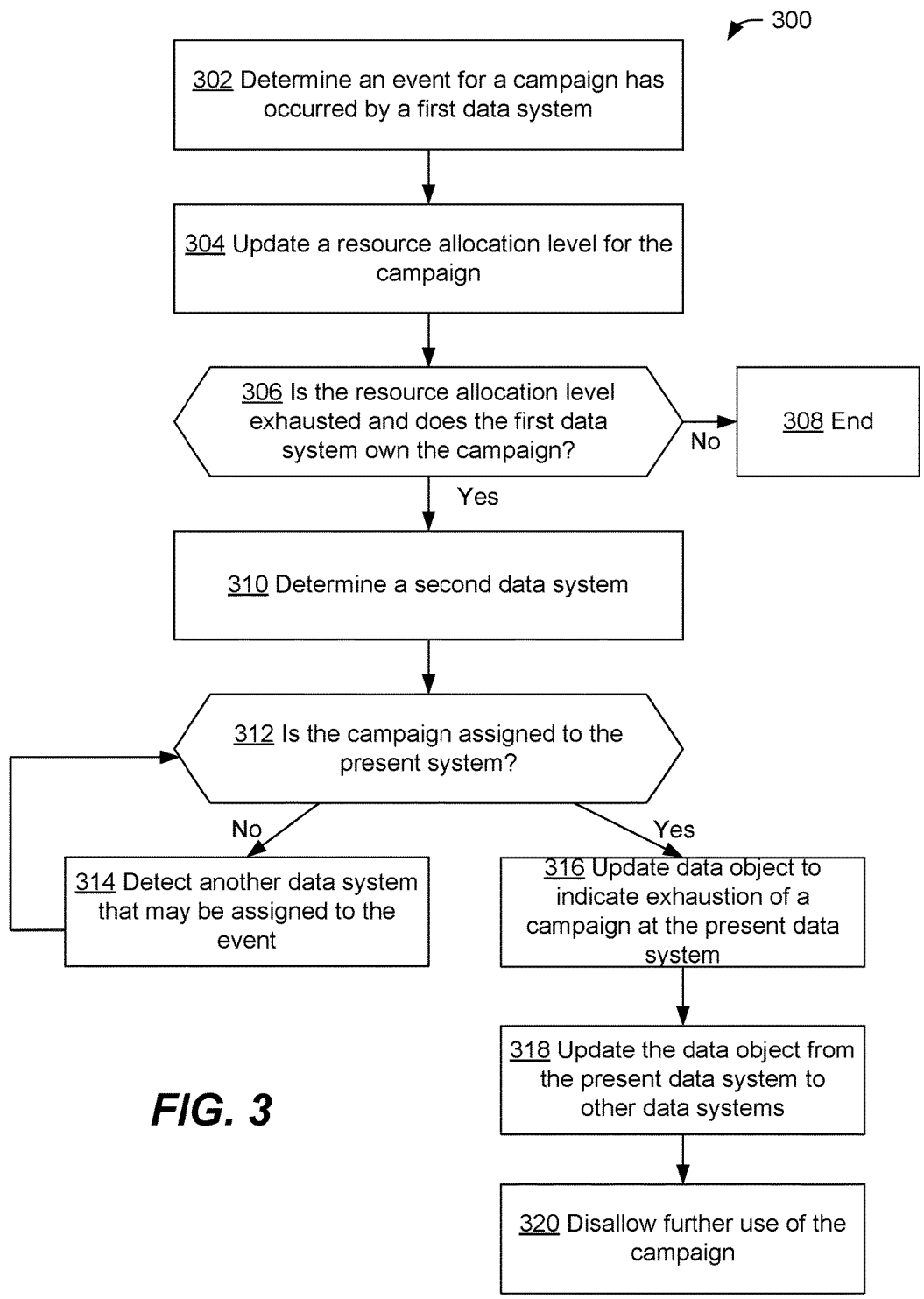
FIG. 3 is a flow that illustrates an example method of managing events in the data center management system.

FIG. 3 is a flow 300 that illustrates an example method of managing events in the data center management system 100. For purposes of illustrating a clear example, FIG. 3 is described herein in the context of FIGS. 1A-1C, but the broad principles of FIG. 3 can be applied to other systems having configurations other than as shown in FIGS. 1A-1C. Further, FIG. 3 illustrates an algorithm or plan that may be used as a basis for programming one or more of the components of FIGS. 1A-1C that relate to the functions that are illustrated in the diagram, using a programming development environment or programming language that is deemed suitable for the task. Thus, FIG. 3 is intended as an illustration at the functional level at which skilled persons, in the art to which this disclosure pertains, communicate with one another to describe and implement algorithms using programming. This diagram is not intended to illustrate every instruction, method object or sub step that would be needed to program every aspect of a working program, but are provided at the high, functional level of illustration that is normally used at the high level of skill in this art to communicate the basis of developing working programs.

3.1 Determine Event has Occurred

In step 302, the data center management system 100 determines an event for a campaign has occurred by a first data system. For example, the first data system may be of the first type of data system that receives the event. An event in the data center management system 100 may be one of many different types of events, depending on the purpose of the data center management system 100. In the embodiment where the data center management system 100 works with a content management system, an event may be a result of a request for access to a content item. For example, the request may occur when a user is browsing the internet and wishes to view a Web page or other content type. The event may not correlate to a specific interaction by the user, but is instead generated by a content provider the user is accessing. In turn, the content provider generates the event, which is processed by the data center management system 100. For example, if the content item is an advertisement, the request may be to view a webpage. The webpage's provider (or a third party) selects an advertisement to show on the webpage. The event is created based on the display or the selection of the advertisement and the event may trigger an update to the advertisement's (or its associated campaign's) status.

In an embodiment, the first system may not be the only data system of the first type of data system to receive the event. For example, there may be multiple data systems of the first type that determine the event has occurred. These data systems may receive the information before, simultaneously, or after the first data system. This may occur because of network congestion, network speed, processing delays, or for a variety of reasons.

3.2 Update Resource Allocation Level

In step 304, the data center management system 100 updates a resource allocation level for a campaign associated with the event. The data center management system 100 discovers how much of the resource allocation should be reduced in response to the event. Not all events may result in the same resource allocation that should be reduced. For example, if the campaign includes a content item, there may be different costs for selecting the content item at one time when compared to another time. This may occur when the content item is selected after a content item auction process. The data center management system 100 reduces the resource allocation for the campaign by the determined amount.

3.3 Determine Campaign Assignment

In step 306, the data center management system 100 determines whether a resource associated with a campaign has been exhausted and whether the campaign is assigned to (or owned by) the first data system.

To determine whether the campaign's resource has been exhausted, the data center management system 100 determines whether a predetermined resource level has been reached or passed. For example, if the resource level is a budget amount, the data center management system 100 will determine that the resource is exhausted when the budget amount has reached zero or goes below zero. In an alternate embodiment, the data center management system 100 includes a buffer amount that, when reached, will cause the data center management system 100 to determine that the resource is exhausted. For example, if the data center management system 100 determines that it is unlikely that a certain budget will be sufficient, then the data center management system 100 may determine that the campaign is exhausted.

To determine whether a campaign has been assigned to a data system, a hash check may be performed. A hash check provides a fast way for the data system to check whether a campaign has been assigned to it. For example, a hash check may use a modulo operation. A result of the modulo operation corresponds to a data system. In an embodiment, the hash includes a modulo function corresponding to a number of data systems of the first type. For example, if the data center management system 100 includes five data systems of the first type and an event includes an identifier of 13 (which may identify a particular campaign with which the event is associated), the modulo result will be three. The data center management system 100 will then be able to find the third data system of the first type, as the system that owns (or has been assigned) a campaign corresponding to the event. Other data verification mechanisms may also be used (e.g., queue, listeners, and other verification methods).

If the first data system is not assigned the campaign or the campaign's resource has not been exhausted, in step 308, there is no further action taken by the first data system for the event.

3.4 Determine Event Assignment

In step 310, if the campaign is assigned to the first data system and the campaign's resource is exhausted, then the data center management system 100 determines a second data system that may be assigned the campaign. The first data system may be of the first type and the second data system of the second type of data system. For example, the first data system is a data system hosted at a first data center and the second data system is also a data system hosted at the first data center. The first data system and the second data system may share one or more computing devices at the first data center to perform operations.

In step 312, the data center management system 100 determines whether the campaign is assigned to the present data system (e.g., the data system determined in steps 310 or 314) for the purposes of indicating whether the campaign has been exhausted. If the campaign is not assigned to the present data system, in step 314, then the data center management system 100 detects another data system that may be assigned to the event. The other data system may include data systems hosted by data centers different than the first data center. This newly detected system in turn, becomes the present system.

For example, the data center management system 100 may select only other data systems of the second type, while ignoring systems of the first type. In an embodiment, the data center management system 100 uses a queue to determine which of the additional systems may be assigned. For example, data systems of the second type may periodically check the queue, to see if there are updates to campaigns to which they are assigned. If the system is not assigned the campaign, it is placed back on the queue for processing by other systems. In an alternate embodiment, the data center management system 100 uses a listener (such as the listener component 110 shown in FIG. 1A) to find which system is assigned a campaign for an item in the queue. The listener contacts the system assigned to the particular campaign. For example, the listener may have information regarding assigning mapping of campaigns and data systems of the second type. In yet another embodiment, the data center management system 100 transmits, from one data system to another data system of the second type, the update, in a round-robin technique, to find which data system of the second type is assigned the particular campaign.

3.5 Update Data Object at a System

In step 316, the data center management system 100 updates, at the present data system (e.g., system 122), a data object to indicate exhaustion of a resource of the campaign. The data center management system 100 may retrieve, from a data source associated with the present data system (e.g., resource completion data source 154), a data object corresponding to the campaign. The value may be a binary value or other type of value, which is changed to indicate that the campaign has been exhausted (or to indicate a change to another status of the campaign). Each data object may correspond to one or more campaigns, depending on the needs of the data center management system 100.

3.6 Update Data Objects at Additional Systems

In step 318, the data center management system 100 updates the data object from the present data system to other systems. For example, the data center management system 100 uses the resource completion updater (such as a resource completion updater 156 shown in FIG. 1C), discovers other data systems of the second type, and updates them to indicate that the campaign has been exhausted.

3.7 Disallow Access to Campaign

In step 320, the data center management system 100 disallows further use of the campaign. If there is more than one content item associated with the campaign, all or a subset of these content items may be disallowed further use. For example, if a check is done on whether there is remaining resource allocation for a particular campaign, then the data center management system 100 will indicate the campaign has been exhausted and that no further access to content items associated with the campaign should be allowed.

4.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
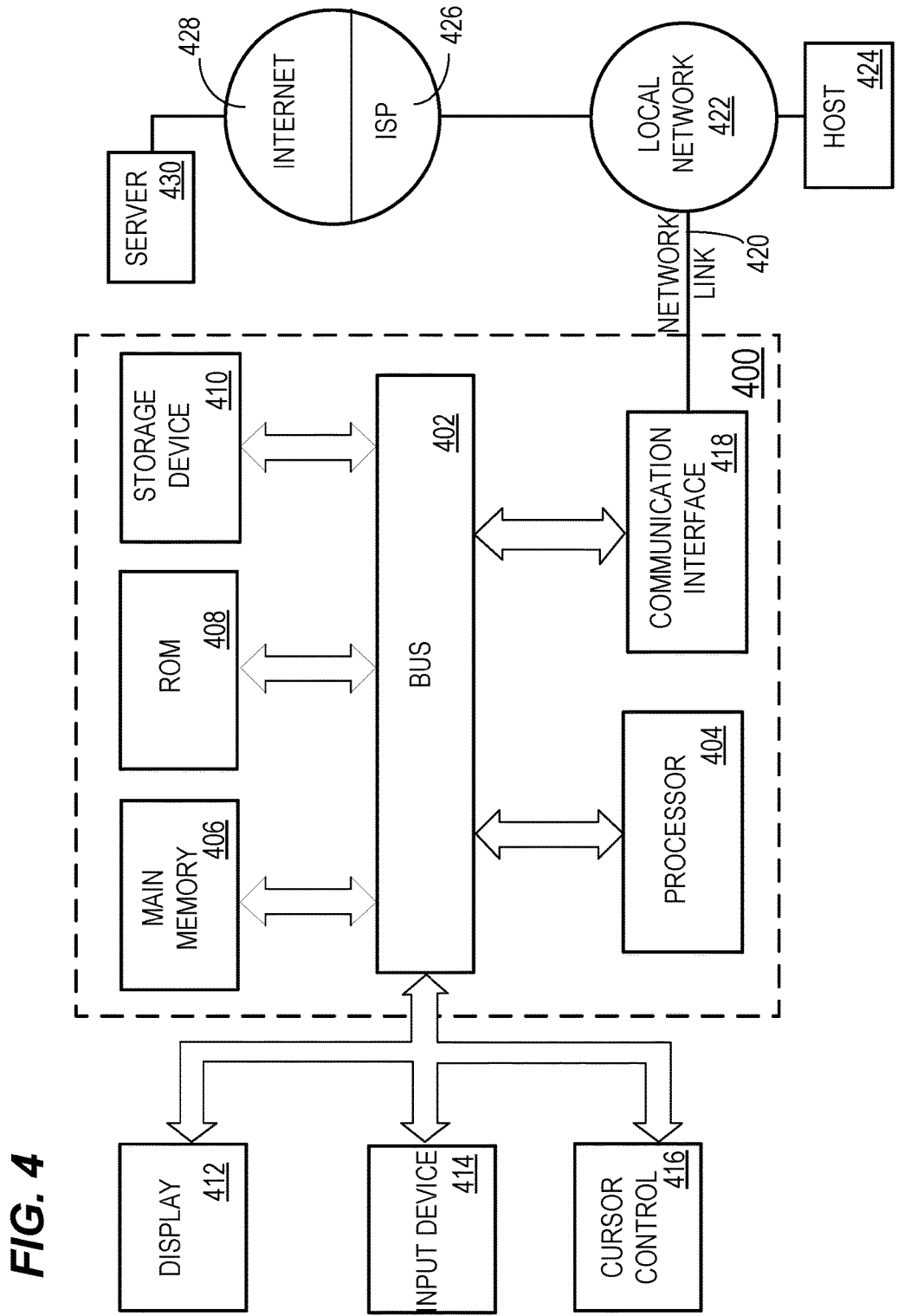
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (for example, x) and a second axis (for example, y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   determining, by a first data system hosted at a first data center, that a particular event occurred;
   sending the particular event to a second data system that is hosted at the first data center;
   determining, by the second data system, whether a data object associated with the particular event is assigned to the first data center;
   in response to determining that the data object is not assigned to the first data center, transmitting the particular event to a second data center that is separate from the first data center;
   determining, by a third data system hosted at the second data center, whether the particular event is assigned to the second data center;
   in response to determining that the data object is assigned to the second data center, updating a copy of the data object based on the particular event to generate an updated copy of the data object;
   determining, by the first data system, that a second event occurred;
   sending the second event to the second data system;
   determining, by the second data system, whether a second data object associated with the second event is assigned to the first data center; and
   in response to determining that the data object is assigned to the first data center, updating a copy of the second data object based on the second event to generate an updated copy of the second data object;

wherein the method is performed by one or more computing devices.

2. The method of claim 1, further comprising:
after generating the updated copy of the data object, causing the updated copy of the data object to be transmitted to the first data center;
replacing, by the second data system hosted at the first data center, a second copy of the data object with the updated copy of the data object.

3. The method of claim 1, further comprising:
determining, by the first data system hosted at the first data center, that a third event occurred;
in response to determining that the third event occurred, determining whether to send the third event to the second data system hosted at the first data center;
determining to not send the second event to the second data system.

4. The method of claim 1, wherein determining whether to send the particular event to the second data system hosted at the first data center comprises
performing a hash lookup to determine, based on a data object identifier contained in the particular event, whether the particular event corresponds to the first data system.

5. The method of claim 1, further comprising:
in response to determining that the particular event occurred, determining whether to send the particular event to the second data system hosted at the first data center,
wherein the sending the particular event to the second data system is executed in response to determining to send the particular event to the second data system.

6. The method of claim 1, further comprising:
determining, by a fourth data system hosted at a third data center, that the particular event occurred;
performing a hash lookup to determine, based on a data object identifier contained in the particular event, whether the particular event corresponds to the fourth data system;
determining the particular event does not correspond to the fourth data system;
determining to not update, by the third data system, the data object assigned to the second data center.

7. The method of claim 6, wherein the performing the hash lookup specifies a single data system that corresponds to the particular event.

8. The method of claim 1, further comprising:
determining a first resource allocation level for a resource associated with the particular event stored at a first data source located at the first data center;
storing an updated first resource allocation level for the resource associated with the particular event stored at the first data source;
determining a second resource allocation level for the resource associated with the particular event stored at a second data source located at the third data center;
storing an updated second resource allocation level for the resource associated with the particular event stored at the second data source.

9. The method of claim 8, wherein a value for the updated first resource allocation level is different than a value for the updated second resource allocation level.

10. The method of claim 8, wherein the updated second resource allocation level indicates exhaustion of the resource and the updated first resource allocation level indicates non-exhaustion of the resource.

11. The method of claim 1, further comprising:
after determining, by the first data system hosted at the first data center, that the particular event occurred, determining a resource allocation level for a campaign associated with the particular event, wherein the particular event comprises a campaign identifier associated with the particular event;
wherein the sending the particular event to the second data system comprises determining the resource allocation level for the campaign has been exhausted after the particular event has occurred.

12. The method of claim 1, further comprising:
before transmitting the particular event to the second data center, storing, in a queue, an indication that the particular event occurred,
wherein the transmitting the particular event to the second data center comprises determining, based on the indication stored in the queue, to transmit the particular event to the second data center.

13. A system comprising:
a plurality of data centers, each data center hosting one or more data systems;
one or more processors;
one or more storage media storing instructions which, when executed by the one or more processors, cause:
determining, by a first data system hosted at a first data center, that a particular event occurred;
sending the particular event to a second data system that is hosted at the first data center;
determining, by the second data system, whether a data object associated with the particular event is assigned to the first data center;
in response to determining that the data object is not assigned to the first data center, transmitting the particular event to a second data center that is separate from the first data center;
determining, by a third data system hosted at the second data center, whether the particular event is assigned to the second data center;
in response to determining that the data object is assigned to the second data center, updating a copy of the data object based on the particular event to generate an updated copy of the data object;
determining, by the first data system, that a second event occurred;
sending the second event to the second data system;
determining, by the second data system, whether a second data object associated with the second event is assigned to the first data center; and
in response to determining that the data object is assigned to the first data center, updating a copy of the second data object based on the second event to generate an updated copy of the second data object.

14. The system of claim 13, wherein the one or more storage media storing instructions which, when executed by the one or more processors, further cause:
after generating the updated copy of the data object, causing the updated copy of the data object to be transmitted to the first data center;
replacing, by the second data system hosted at the first data center, a second copy of the data object with the updated copy of the data object.

15. The system of claim 13, wherein the one or more storage media storing instructions which, when executed by the one or more processors, further cause:

determining, by the first data system hosted at the first data center, that a second event occurred;

in response to determining that the second event occurred, determining whether to send the second event to the second data system hosted at the first data center;

determining to not send the second event to the second data system.

16. The system of claim 13, wherein the one or more storage media storing instructions which, when executed by the one or more processors, wherein determining whether to send the particular event to a second data system hosted at the first data center comprises performing a hash lookup to determine, based on a data object identifier contained in the particular event, whether the particular event corresponds to the first data system.

17. One or more storage media storing instructions which, when executed by one or more processors, cause:

determining, by a first data system hosted at a first data center, that a particular event occurred;

sending the particular event to a second data system that is hosted at the first data center;

determining, by the second data system, whether a data object associated with the particular event is assigned to the first data center;

in response to determining that the data object is not assigned to the first data center, transmitting the particular event to a second data center that is separate from the first data center;

determining, by a third data system hosted at the second data center, whether the particular event is assigned to the second data center;

in response to determining that the data object is assigned to the second data center, updating a copy of the data object based on the particular event to generate an updated copy of the data object;

determining, by the first data system, that a second event occurred;

sending the second event to the second data system;

determining, by the second data system, whether a second data object associated with the second event is assigned to the first data center; and in response to determining that the data object is assigned to the first data center, updating a copy of the second data object based on the second event to generate an updated copy of the second data object.

18. The one or more storage media of claim 17, wherein the first data center and the second data center are located in different countries.

19. The one or more storage media of claim 17, wherein the instructions, when executed by the one or more processors, further cause:

after generating the updated copy of the data object, causing the updated copy of the data object to be transmitted to the first data center;

replacing, by the second data system hosted at the first data center, a second copy of the data object with the updated copy of the data object.

20. The one or more storage media of claim 17, wherein determining whether to send the particular event to the second data system comprises performing a hash lookup to determine, based on a data object identifier contained in the particular event, whether the particular event corresponds to the first data system.

* * * * *